United States Patent
Gigot

(10) Patent No.: US 10,742,887 B1
(45) Date of Patent: Aug. 11, 2020

(54) APPARATUS COMPRISING A PROCESSOR CONFIGURED TO PERFORM ELECTRONIC IMAGE STABILIZATION USING A CALCULATED WARP TABLE

(71) Applicant: Ambarella International LP, Santa Clara, CA (US)

(72) Inventor: Jerome N. Gigot, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 15/293,571

(22) Filed: Oct. 14, 2016

(51) Int. Cl.
*H04N 5/228* (2006.01)
*H04N 5/232* (2006.01)
*B64C 39/02* (2006.01)
*B64D 47/08* (2006.01)
*G05D 1/00* (2006.01)

(52) U.S. Cl.
CPC ....... *H04N 5/23267* (2013.01); *B64C 39/024* (2013.01); *B64D 47/08* (2013.01); *G05D 1/0038* (2013.01); *B64C 2201/127* (2013.01); *B64C 2201/146* (2013.01)

(58) Field of Classification Search
CPC .............................................. B64C 2201/127
See application file for complete search history.

(56) References Cited

U.S. PATENT DOCUMENTS

| | | | | |
|---|---|---|---|---|
| 8,587,673 B2 * | 11/2013 | McLeod | ............ | H04N 5/23248 348/208.2 |
| 2003/0215010 A1 * | 11/2003 | Kashiwa | .......... | G08B 13/19621 375/240.02 |
| 2005/0066083 A1 * | 3/2005 | Chan | .................... | H04N 9/8042 710/52 |
| 2012/0200703 A1 * | 8/2012 | Nadir | .................. | G02B 27/644 348/144 |
| 2013/0083202 A1 * | 4/2013 | Batur | ................. | H04N 5/23248 348/169 |
| 2013/0182104 A1 * | 7/2013 | Mangold | .......... | H04N 21/21805 348/143 |
| 2013/0222604 A1 * | 8/2013 | Ingerhed | .................. | H04N 5/33 348/164 |
| 2017/0006340 A1 * | 1/2017 | Enke | ................ | H04N 21/44028 |

OTHER PUBLICATIONS

TheZafir38, "Pure Analog FPV Flight", https://www.youtube.com/watch?v=-EyWCVys7VQ, Jul. 23, 2014, 1 page.

Benson, C., "How to Make a Drone / UAV—Lesson 7: FPV & Long-range", http://www.robotshop.com/blog/en/how-to-make-a-drone-uav-lesson-7-fpv-long-range-17518, Mar. 23, 2016, 18 pages.

* cited by examiner

*Primary Examiner* — Gary C Vieaux
(74) *Attorney, Agent, or Firm* — Christopher P. Maiorana, PC

(57) ABSTRACT

An apparatus comprising an image sensor and a processor. The image sensor may be configured to generate a video signal based on a targeted view of an environment. The processor may be configured to (A) perform an image stabilization on the video signal and (B) generate (i) a first output video signal and (ii) a second output video signal. The first output video signal may be generated on a low-latency path. The second output video signal may be generated on an encoding path. The image stabilization may be performed prior to the generation of the first output video signal and the second output video signal.

18 Claims, 8 Drawing Sheets

US 10,742,887 B1

APPARATUS COMPRISING A PROCESSOR CONFIGURED TO PERFORM ELECTRONIC IMAGE STABILIZATION USING A CALCULATED WARP TABLE

FIELD OF THE INVENTION

The invention relates to video capture devices generally and, more particularly, to a method and/or apparatus for implementing an electronic image stabilization of a low-latency video stream in a flying camera.

BACKGROUND

Operating unmanned aerial vehicles (or drones) has become a popular hobby. One particular area that has increased in popularity is racing using camera-equipped drones. In particular, drone racing can be used in combination with live video feeds (i.e., watched using video headsets) from the camera-equipped drones to provide a first-person view racing experience. A first-person video feed from the drone allows for an immersive racing experience.

Drones are controlled remotely by a pilot. To provide an enjoyable first-person racing experience, the video feed from the drone should be transmitted with low-latency. Low-latency ensures that a drone pilot can react quickly to the racing environment. Many racing drones use an analog video feed from the drone to a ground controller (or headset goggles) in order to achieve the lowest delay possible.

Many drone racers enjoy storing high-quality videos of drone races for later viewing. Generating high-quality videos increases latency, which may be unsuitable for a live feed used by the pilot to control the drone. A typical racing drone setup would have high-quality video (i.e., 720p, 1080p resolution) encoded and stored on a local storage device, and then a live view analog video feed sent directly through a radio-frequency (RF) channel to the ground controller.

The live view analog video feed is created in an effort to avoid incurring the encoding delay in the live view stream. However, racing drones can fly fast and can travel in various directions. Without the encoding used for the high-quality videos, image stabilization is not performed on the live view. Major drawbacks of using a live view analog video feed approach are that the video is very jerky, has rolling shutter artifacts, and is not stabilized.

It would be desirable to implement an electronic image stabilization of a low-latency video stream in a flying camera.

SUMMARY

The invention concerns an apparatus comprising an image sensor and a processor. The image sensor may be configured to generate a video signal based on a targeted view of an environment. The processor may be configured to (A) perform an image stabilization on the video signal and (B) generate (i) a first output video signal and (ii) a second output video signal. The first output video signal may be generated on a low-latency path. The second output video signal may be generated on an encoding path. The image stabilization may be performed prior to the generation of the first output video signal and the second output video signal.

BRIEF DESCRIPTION OF THE FIGURES

Embodiments of the invention will be apparent from the following detailed description and the appended claims and drawings in which.

DETAILED DESCRIPTION OF THE EMBODIMENTS

Embodiments of the present invention may (i) provide electronic image stabilization of a low-latency video stream in a flying camera, (ii) provide a live video feed to a ground controller and an encoded high-quality video feed for storage, (iii) implement a hardware engine to perform image stabilization, (iv) perform image stabilization before video encoding, (v) implement a hardware engine to perform a correction for a rolling shutter effect, (vi) perform a correction for a rolling shutter effect before video encoding, (vii) downscale captured video for wireless transmission, (viii) reduce an amount of latency when transmitting a stabilized video stream and/or (ix) be implemented as one or more integrated circuits.

Transmitting an encoded digital video, end-to-end, in less than 50 ms may be difficult to achieve. In an uncontrolled environment (e.g., an outdoor environment for flying a drone) and/or transmitting video over a weak and/or unreliable Wi-Fi signal may introduce additional difficulties and/or delay for transmitting an encoded digital video. When transmitting an analog video signal, the end-to-end delay may be much less than transmitting the digital signal. A trade-off may be that in the analog video, noise may introduce signal deterioration. Generally, digital systems try to correct for the deterioration that may be introduced in an analog system. Embodiments of the present invention may implement transmission of a low-latency video signal with image stabilization and/or correction for a live video feed, while providing a high-quality video stream with digital corrections.

Figure 1:
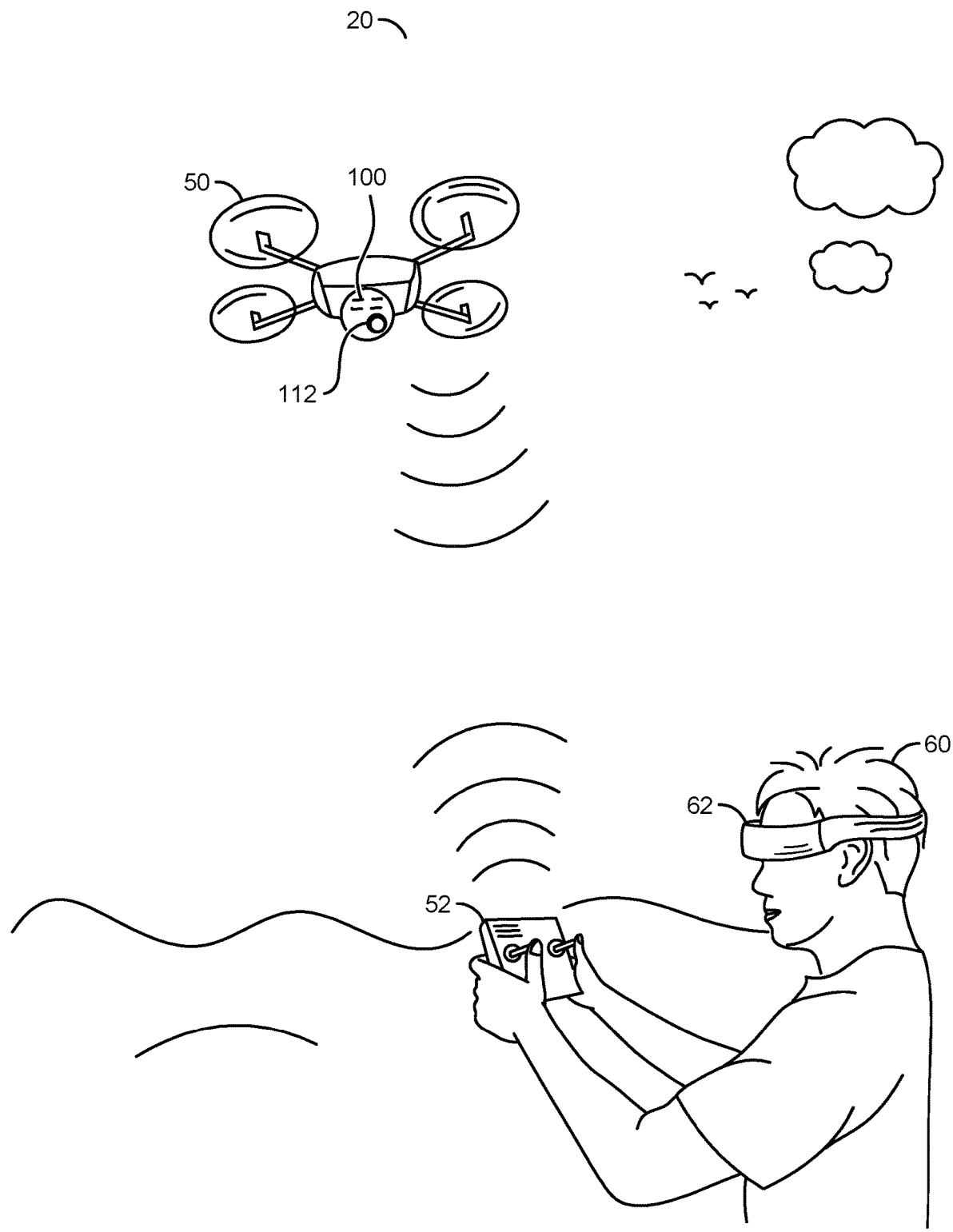
FIG. 1 is a diagram illustrating a context of an embodiment of the present invention.

Referring to FIG. 1, a diagram illustrating a context of an embodiment of the present invention is shown. A system 20 is shown. The system 20 may comprise an unmanned aerial vehicle (or drone) 50, a remote controller 52, a pilot 60, a viewing device 62, an apparatus 100 and/or a lens 112. The system 20 may be implemented to control the drone 50 and/or receive video from the perspective of the drone 50.

The drone 50 may be capable of hovering and/or moving in a variety of directions. For example, the drone 50 may accelerate and/or change direction quickly. The drone 50 may comprise the apparatus 100, the lens 112 and/or other components (not shown).

In some embodiments, the lens 112 may be directed towards one particular direction (e.g., static). In some embodiments, the lens 112 may move (e.g., the direction of the lens 112 may be controllable). The lens 112 may be configured to zoom in/out. The implementation of the lens 112 may be varied according to the design criteria of a particular implementation.

The apparatus 100 may be configured to capture images and/or video of the environment near the drone 50. For example, the apparatus 100 may capture the environment in the direction of the lens 112. The apparatus 100 may be configured to generate video signals based on the captured images. The apparatus 100 may format the video signals to be transmitted wirelessly and/or stored locally. For example, the drone 50 may comprise a wireless transmission module, and the apparatus 100 may provide the video signal to the wireless transmission module. The drone 50 is shown transmitting data wirelessly. For example, the drone 50 may wirelessly transmit a video stream generated by the apparatus 100. The pilot 60 is shown holding the remote controller 52 and wearing the viewing device 62. The viewing device 62 is shown as a headset. In some embodiments, the viewing device 62 may be implemented as a screen (e.g., a screen that is part of the remote controller 52). The remote controller 52 may be configured to send control data to the drone 50. For example, the remote controller 52 may implement a radio frequency (RF) transmission to control the drone 50. The pilot 60 may provide input to the remote controller 52 to direct the movement of the drone 50. The input by the pilot 60 using the remote controller 52 may be intentional movement for the drone 50.

The viewing device 62 may be configured to receive the video stream from the drone 50. The video stream may be a live video feed. The video stream may provide the pilot 60 with a view from the perspective of the drone 50. When the viewing device 62 is implemented as a headset, the video stream may provide a first-person view (FPV) of the drone 50.

In some embodiments, the system 20 may be implemented for FPV racing of the drone 50. The headset 62 may receive the video stream live from the drone 50. The pilot 60 may view the video stream using the headset 62 to see a live view from the perspective of the drone 50. The pilot 60 may react to the environment by viewing the video captured by the apparatus 100 and provide control to the drone 50 using the remote controller 52. In a racing embodiment, the pilot 60 may need to react quickly to traverse a set course as fast as possible and/or prevent the drone 50 from crashing and/or traveling out of the bounds of the course.

To provide a useful view to the pilot 60, the video stream may be generated with low and/or negligible delay. The pilot 60 may be unable to react appropriately if there is lag (e.g., a delay) between what is viewed on the viewing device 62 and where the drone 50 is actually located. Without the apparatus 100, the quality of the video that the pilot 60 sees in the headset 62 may be low-quality, shaky and/or wobbly. For example, low-quality and/or shaky video may be distracting and/or reduce a feeling of immersiveness. In another example, shaky and/or wobbly video may cause nausea for the pilot 60. The apparatus 100 may be configured to provide a low-latency video stream from the drone 50 to the viewing device 62. The apparatus 100 may be configured to correct visual artifacts (e.g., shakiness due to the movement of the drone 50, wobbling caused by a rolling shutter effect, lag, etc.) in the video stream.

Figure 2:
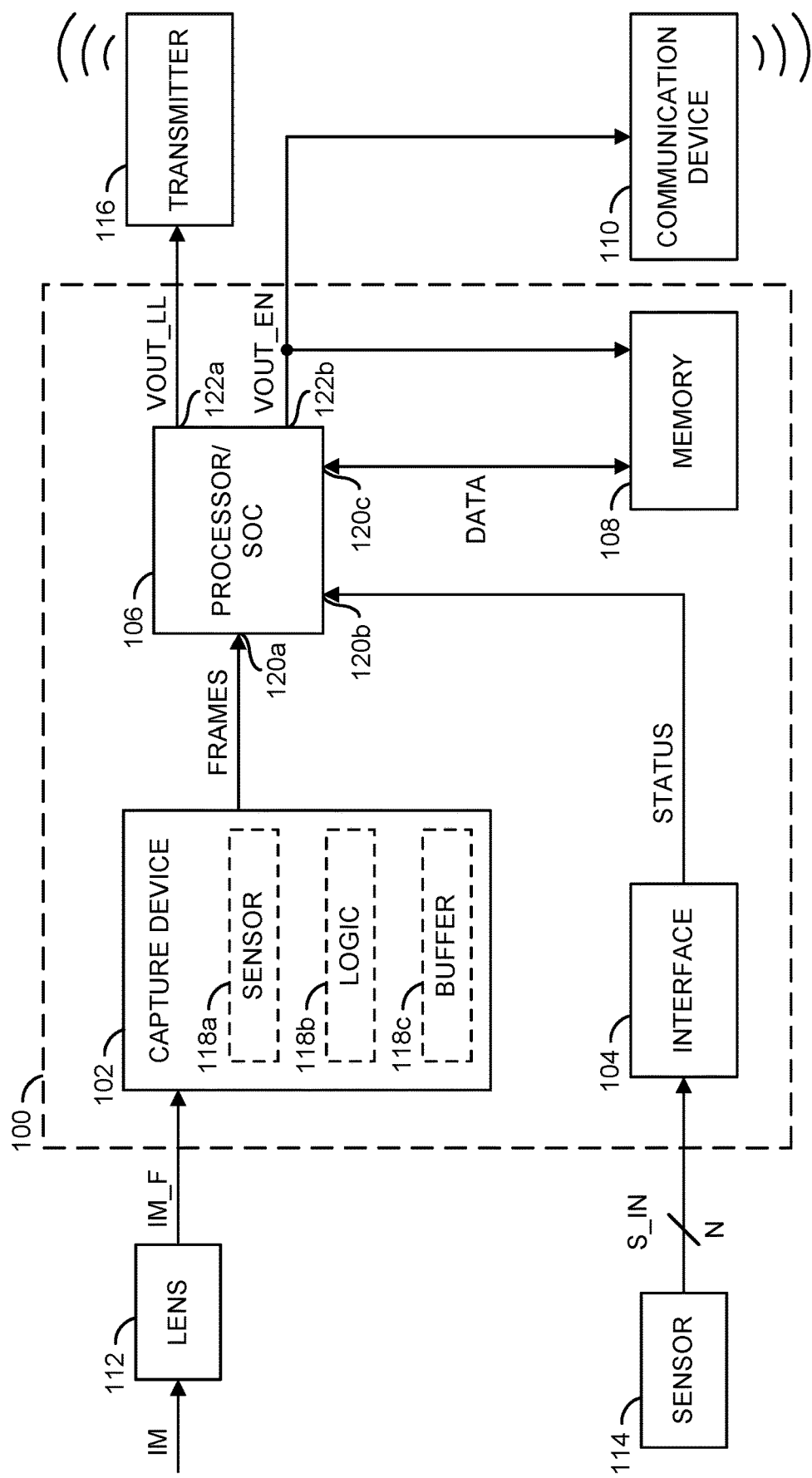
FIG. 2 is a block diagram illustrating components of a video capture system.

Referring to FIG. 2, a block diagram illustrating components of the video capture system 100 is shown. The apparatus 100 generally comprises a block (or circuit) 102, a block (or circuit) 104, a block (or circuit) 106, and a block (or circuit) 108. The circuit 102 may be implemented as a capture device. The circuit 104 may be implemented as an interface circuit. The circuit 106 may be implemented as a processor and/or a system-on-chip (SoC). In an example implementation, the circuit 106 may be implemented as a video processor. The video processor 106 may comprise inputs 120a-120c and/or other inputs. The video processor 106 may comprise outputs 122a-122b and/or other outputs. The circuit 108 may be implemented as a memory.

The apparatus 100 may receive a signal (e.g., IM_F) and a signal (e.g., S_IN). The apparatus 100 may present a signal (e.g., VOUT_LL) and a signal (e.g., VOUT_EN). The capture device 102 may receive the signal IM_F from the lens 112. The apparatus 100 (or the interface 104, or the video processor 106) may receive the signal S_IN from a block (or circuit) 114. The circuit 114 may implement a sensor. For example, the sensor 114 may be a gyroscope, accelerometer and/or an inertial measurement unit. The video processor 106 may present the signal VOUT_LL to a block (or circuit) 116. The circuit 116 may be a wireless transmitter. For example, the wireless transmitter 116 may be a radio-frequency (RF) transmitter. The video processor 106 may present the signal VOUT_EN to a block (or circuit) 110). The circuit 110 may implement a communication device. For example, the communication device 110 may be a Wi-Fi module.

The lens 112 may capture a signal (e.g., IM). The signal IM may be an image (e.g., an analog image) of the environment near the drone 50 that is presented by the lens 112 to the capture device 102 as the signal IMF. The circuit 112 may be implemented as a lens, such as an optical lens. The lens 112 may provide a zooming feature and/or a focusing feature. The capture device 102 and/or the lens 112 may be implemented, in one example, as a single lens assembly. In another example, the lens 112 may be a separate implementation from the capture device 102. The capture device 102 is shown within the circuit 100. In an example implementation, the capture device 102 may be implemented outside of the circuit 100 (e.g., along with the lens as part of a lens/capture device assembly).

The capture device 102 may be configured to capture video image data (e.g., the signal IM_F from the lens 112). In some embodiments, the capture device 102 may be a video capturing device such as a camera. The capture device 102 may capture data received through the lens 112 to generate a bitstream (e.g., generate video frames). For example, the capture device 102 may receive light from the lens 112. The lens 112 may be directed, tilted, panned, zoomed and/or rotated to provide a targeted view from the drone 50 (e.g., a field of view). The capture device 102 may generate a signal (e.g., FRAMES). The signal FRAMES may be video data (e.g., a sequence of video frames). The signal FRAMES may be presented to the input 120a of the video processor 106.

The capture device 102 may transform the received light signal IM_F into digital data (e.g., a bitstream). In some embodiments, the capture device 102 may perform an analog to digital conversion. For example, the capture device 102 may perform a photoelectric conversion of the light received by the lens 112. The capture device 102 may transform the bitstream into video data, a video file and/or video frames (e.g., perform encoding). In some embodiments, the video data generated by the capture device 102 may be an analog video signal (e.g., raw data generated in response to the light from the lens 112). In some embodiments, the video data may be a digital video signal. The video signal may comprise video frames.

In some embodiments, the apparatus 100 may further comprise an audio capture device (e.g., a microphone). The audio capture device may capture audio of the environment. The apparatus 100 may be configured to synchronize the audio captured with the images captured by the capture device 102.

In some embodiments, the interface circuit 104 may receive the signal S_IN. The signal S_IN may represent raw sensor data. For example, the signal S_IN may represent motion data of the drone 50. The format of the signal S_IN may be varied according to the design criteria of a particular implementation.

In an example implementation, the interface 104 is shown presenting a signal (e.g., STATUS) to the input 120b of the video processor 106. The signal STATUS may represent various input received by the interface 104. In an example, the signal STATUS may be a digital signal presented in a format readable by the video processor 106.

In some embodiments, the interface 104 may be an optional component. For example, the sensor 114 (e.g., a 6-axis gyro/accelerometer) may provide data (e.g., the signal S_IN) directly to the video processor 106 though a Serial Peripheral Interface (SPI) bus (e.g., the interface 104 may be a component of the video processor 106). The video processor 106 may comprise a driver (e.g., a software driver) to interpret the data (e.g., the data format of the signal S_IN) coming out of the sensor 114 and use the data for stabilization (e.g., generate the signal STATUS).

The circuit 114 may be implemented as one or more sensors (e.g., a location module such as a GPS sensor, an orientation module such as a magnetometer, a vibration sensor, steering sensors, etc.). Generally, the sensors 114 may be input/output devices separate from the capture device 102. In some embodiments, information from the sensor 114 may comprise intentional movement controls sent by the pilot 60 using the remote controller 52. The video processor 106 may receive the signal FRAMES from the capture device 102 at the input 120a, the signal STATUS from the interface 104 at the input 120b and/or a signal (e.g., DATA) from the memory 108 at the input 120c. The video processor 106 may be connected through a bi-directional interface (or connection) to the memory 108. The video processor 106 may store and/or retrieve data from the memory 108. In an example, the video processor 106 may dump video frames (e.g., whole video frames) to the memory 108 (e.g., before encoding and/or stabilization). The memory 108 may be configured to store computer readable/executable instructions (or firmware). The instructions, when executed by the video processor 106 may perform a number of steps. In some embodiments, the processor 106 may be implemented as a system-on-chip (SoC) and the memory 108 may be a component of the processor 106.

The video processor 106 may be configured to receive the signal FRAMES, the signal STATUS (or the signal S_IN), the signal DATA and/or other inputs (e.g., at the inputs 120a-120c). The signal FRAMES may comprise video data (e.g., one or more video frames) providing a field of view captured by the lens 112. The video processor 106 may be configured to generate the signal VOUT_LL, the signal VOUT_EN and/or other signals (not shown). The signal VOUT_LL and/or the signal VOUT_EN may be generated based on one or more decisions made and/or functions performed by the video processor 106. The decisions made and/or functions performed by the video processor 106 may be determined based on data received by the video processor 106 at the inputs 120a-120c (e.g., the signal FRAMES, the signal STATUS, the signal DATA and/or other inputs).

The signal VOUT_LL may be presented to the RF transmitter 116. The signal VOUT_LL may be a stabilized and/or rolling shutter effect corrected version of the signal FRAMES. The signal VOUT_LL may be generated on a low-latency path (e.g., there may be little delay in generating the signal VOUT_LL compared to the delay in generating the signal VOUT_EN). The signal VOUT_EN may comprise one or more video frames (e.g., a series of video frames). The signal VOUT_EN may be presented to the communication device 110. The signal VOUT_EN may be a high resolution, digital, encoded, stabilized and/or rolling shutter effect corrected version of the signal FRAMES. Generating the signal VOUT_EN may take longer than generating the signal VOUT_LL. The signal VOUT_LL may be a live video feed usable by the display device 62 without decoding from the frequency domain. Generally, the visual quality of the signal VOUT_EN to a viewer may be higher than the visual quality of the signal VOUT_LL to a viewer (e.g., higher resolution, greater detail visible, greater number of frames per second, better compression, etc.).

The apparatus 100 may implement a camera system. In some embodiments, the camera system 100 may be implemented as a drop-in solution (e.g., installed as one component). In an example, the camera system 100 may be a device that may be installed as an after-market product for the drone 50 (e.g., a retro-fit for the drone 50). The number and/or types of signals and/or components implemented by the camera system 100 may be varied according to the design criteria of a particular implementation.

The video data of the targeted view from the drone 50 may be represented as the signal/bitstream/data FRAMES (e.g., a video signal). The capture device 102 may present the signal FRAMES to the input 120a of the video processor 106. The signal FRAMES may represent the video frames/video data. The signal FRAMES may be a video stream captured by the capture device 102. In some embodiments, the capture device 102 may be implemented in a camera. In some embodiments, the capture device 102 may be configured to add to existing functionality of a camera.

The capture device 102 may comprise blocks (or circuits) 118a-118c. The circuit 118a may implement a camera sensor. The circuit 118b may implement a camera processor/logic. The circuit 118c may implement a memory buffer. The camera sensor 118a may receive light from the lens 112 and transform the light into digital data (e.g., the bitstream). For example, the camera sensor 118a may perform a photoelectric conversion of the light from the lens 112. The sensor 118a may capture at a high framerate (e.g., 120 fps). The logic 118b may transform the bitstream into a human-legible content (e.g., video data). For example, the logic 118b may receive pure (e.g., raw) data from the camera sensor 118a and generate video data based on the raw data (e.g., the bitstream). The memory buffer 118c may store the raw data and/or the processed bitstream. For example, the frame memory and/or buffer 118c may store (e.g., provide temporary storage and/or cache) one or more of the video frames (e.g., the video signal).

The interface 104 may receive data from one or more components of the drone 50, the pilot 60 and/or other components of the camera system 100 (e.g., the communication device 110). The signal STATUS may be generated in response to the data received from the components of the drone 50 (e.g., the sensor 114). In some embodiments, the interface 104 may receive data from the video processor 106 (e.g., in response to decisions made by the video processor 106, etc.). The interface 104 may be configured to send data (e.g., instructions) from the video processor 106 to the components of the drone 50. For example, the interface 104 may be bi-directional.

In the example shown, the data received by the interface 104 may be the status information (e.g., data presented to the video processor 106 as the signal STATUS). The status information may be used by the video processor 106 to determine the movement of the drone 50 (e.g., to provide information to perform image stabilization). In the example shown, the data received by the interface 104 may be information from a gyroscope sensor, information from an inertial measurement unit, information from one or more components of the drone 50, etc. (e.g., presented to the video processor 106 as the signal STATUS). In some embodiments, the status information may comprise the intentional movements of the drone 50 transferred by the remote control 52. The type of data and/or the number of components of the drone 50 that provide data may be varied according to the design criteria of a particular implementation.

In some embodiments, information from the sensors 114 (e.g., a location module, an orientation module, a vibration module, etc.) may be received by the interface 104. In one example, the interface 104 may be implemented as an electronic bus and the sensors 114 may be part of the drone 50. In another example, the interface 104 may be implemented as an electronic device (e.g., a chip) with a bus controller. In some embodiments, the sensors 114 may connect directly to the video processor 106 (e.g., the video processor 106 may implement a bus controller for compatibility, the video processor 106 may implement a serial peripheral interface (SPI), the video processor 106 may implement another interface, etc.). In some embodiments, the sensors 114 may connect to the memory 108.

The video processor 106 may be configured to execute computer readable code and/or process information. The video processor 106 may be configured to receive input and/or present output to the memory 108. The video processor 106 may be configured to present and/or receive other signals (not shown). The number and/or types of inputs and/or outputs of the video processor 106 may be varied according to the design criteria of a particular implementation.

The video processor 106 may receive the signal FRAMES, the signal STATUS and/or the signal DATA. The video processor 106 may make a decision based on data received at the inputs 120a-120c and/or other input. Data received at the inputs 120a-120c may comprise external signals generated in response to user input, external signals generated by the sensors 114 and/or internally generated signals such as signals generated by the video processor 106 in response to analysis of the signal FRAMES and/or objects detected in the signal FRAMES. The video processor 106 may adjust the video data (e.g., crop, digitally move, physically move the camera sensor 118a, etc.) of the signal FRAMES. The video processor 106 may generate the signal VOUT_LL and/or VOUT_EN in response to the data received by the inputs 120a-120c and/or the decision made in response to the data received by the inputs 120a-120c.

The signal VOUT_LL may be generated to provide an output for the transmitter 116 in response to the captured video frames (e.g., the signal FRAMES) and the motion data (e.g., the signal STATUS). For example, the input STATUS may be sent to the video processor 106 (via the optional interface 104) in order to perform image stabilization and/or rolling shutter effect correction with low latency. The video processor 106 may present the signal VOUT_LL to the transmitter 116 in real-time and/or near real-time (e.g., with minimal delay). The signal VOUT_LL may be a live (or nearly live) video stream. The signal VOUT_LL may be transmitted to the display device 62 (e.g., using RF communication) to provide the pilot 60 with a view from the perspective of the drone 50 that is representative of the current field of view captured by the lens 112. Generally, the signal VOUT_LL may correspond to the data received at the inputs 120a-120c and/or analyzed (e.g., stabilized, corrected, cropped, downscaled, etc.) by the video processor 106. For example, the signal VOUT_LL may be a corrected and/or stabilized version of the signal FRAMES that may be generated fast enough to allow the pilot 60 to react quickly to the environment.

The signal VOUT_EN may be generated to provide an output to the communication device 110 and/or the memory 108 in response to the captured video frames (e.g., the signal FRAMES) and the motion data (e.g., the signal STATUS). For example, the input STATUS may be sent to the video processor 106 (via the optional interface 104) in order to perform image stabilization and/or rolling shutter effect correction with low latency. The video processor 106 may further encode and/or compress the signal FRAMES to generate the signal VOUT_EN. The video processor 106 may present the signal VOUT_EN to the communication module 110 and/or the memory 108 after a time needed to generate the signal VOUT_LL. For example, the signal VOUT_EN may be processed by the video processor 106 in parallel with the signal VOUT_LL and the signal VOUT_EN may take longer to generate than the signal VOUT_LL. The signal VOUT_EN may be communicated to an external device and/or stored in the memory 108. The signal VOUT_EN may be generated to provide a high quality version of the field of view captured by the lens 112, which may be stored, shared and/or viewed at a later time. For example, the pilot 60 may upload the video stored using the signal VOUT_EN to a video sharing site (e.g., YouTube, Facebook, Twitter, Dailymotion, etc.). Generally, the signal VOUT_EN may correspond to the data received at the inputs 120a-120c and/or analyzed (e.g., stabilized, corrected, cropped, packetized, encoded, compressed, etc.) by the video processor 106.

The cropping, downscaling, stabilization, packetization, encoding, compression and/or conversion performed by the video processor 106 may be varied according to the design criteria of a particular implementation. For example, the signals VOUT_LL and VOUT_EN may be a processed version of the signal FRAMES to fit the shape of the display device 62 and/or to emulate a view from perspective of the drone 50. For example, the display device 62 may be implemented for real-time video streaming of the signal VOUT_LL received from the video processor 106. Generally, the signals VOUT_LL and/or VOUT_EN are some view (or derivative of some view) captured by the capture device 102. In some embodiments, the signals VOUT_LL and/or VOUT_EN may provide a series of video frames that improves upon the view from the perspective of the drone 50 (e.g., provides night vision, provides High Dynamic Range (HDR) imaging, provides more viewing area, highlights detected objects, provides additional data such as a numerical distance to detected objects, provides visual indicators for paths of a race course, etc.).

The memory 108 may store data. The memory 108 may be implemented as a cache, flash memory, DRAM memory, etc. The type and/or size of the memory 108 may be varied according to the design criteria of a particular implementation. The data stored in the memory 108 may correspond to a video file, status information (e.g., readings from the sensors 114, pre-selected fields of view, user preferences, user inputs, etc.) and/or metadata information.

The communication device 110 may send and/or receive data to/from the video processor 106. In some embodiments, the communication device 110 may be implemented as a wireless communications module. In some embodiments, the communication device 110 may be implemented as a satellite connection to a proprietary system. In one example, the communication device 110 may be a hard-wired data port (e.g., a USB port, a mini-USB port, a USB-C connector, HDMI port, an Ethernet port, a DisplayPort interface, a Lightning port, etc.). In another example, the communication device 110 may be a wireless data interface (e.g., Wi-Fi, Bluetooth, ZigBee, cellular, 5G, LTE, etc.).

The lens 112 (e.g., a camera lens) may be directed to provide a targeted view from the drone 50. The lens 112 may be aimed to capture environmental data (e.g., light). The lens 112 may be configured to capture and/or focus the light for the capture device 102. Generally, the camera sensor 118a is located behind the lens 112. Based on the captured light from the lens 112, the capture device 102 may generate a bitstream and/or video data.

Data from the sensors 114 may be presented to the video processor 106 as the signal STATUS. The number and/or types of the sensors 114 may be varied according to the design criteria of a particular implementation. The sensors 114 may be used by the camera system 100 to determine a movement direction of the drone 50. The signal STATUS may provide information for the camera system 100 (e.g., the status information) from various types of the drone sensors 114. In one example, location-related information may be determined by a location module (e.g., to determine weather conditions for the current location of the drone 50). For example, the location module may be implemented as a GPS sensor. Orientation information may be determined by an orientation module. For example, the orientation module may be implemented as a magnetometer, an accelerometer and/or a gyroscope. In yet another example, a module may be implemented to determine vibration. For example, the drone sensors 114 may be configured to perform vibration detection, motion detection, speed detection, acceleration detection, rotation detection and/or orientation detection.

The types of the sensors 114 used to implement the location module, the orientation module, the vibration module and/or any other types of sensors may be varied according to the design criteria of a particular implementation. In some embodiments, the signal STATUS may provide details about the drone 50.

Different channels may be implemented to transmit video and drone control. In an example, the video transmitter 116 may implement one channel to transmit video and a remote-control (RC) transmitter may implement a different channel for drone control (e.g., pilot movements input using the remote control 52). Example frequencies may comprise 900 MHz, 1.2 GHz, 2.4 GHz and/or 5.8 GHz. In an example, if the drone 50 uses a RC transmitter on one of the frequencies for control, then, in order to avoid interference, another one of the frequencies should be selected for the video transmitter 116. For example, many video transmitters operate at 5.8 GHz. Other frequencies may be implemented. The channels used for a particular type of communication (e.g., video or control) and/or the frequencies used may be varied according to the design criteria of a particular implementation.

Embodiments of the apparatus 100 may stabilize the visual content of the live video stream (e.g., the signal VOUT_LL). In one example, the live video stream VOUT_LL may be an analog video stream. The video processor 106 may be configured to perform electronic image stabilization (EIS). The stabilized video generated by the video processor 106 may be sent to the output 122a (e.g., the signal VOUT_LL) and/or the output 122b (e.g., the signal VOUT_EN). In one example, the signal VOUT_LL may be an HDMI output. In another example, the signal VOUT_LL may be a composite (e.g., NTSC) output (e.g., composite output may be a low-cost alternative to HDMI output). In yet another example, the signal VOUT_LL may be a S-Video output. In some embodiments, the stabilized video signal VOUT_LL may be downscaled by the video processor 106. The stabilized video signal VOUT_LL may be output to the wireless transmitter 116. In an example, the wireless transmitter 116 may be a RF transmitter.

The stabilized video generated by the video processor 106 may also be used to generate a high-quality video. To generate the high-quality video, the video processor 106 may be configured to perform encoding. The encoded video may be stored locally and/or transmitted wirelessly to external storage (e.g., network attached storage, cloud storage, etc.). In an example, the encoded, high-quality video may be stored locally by the memory 108. In another example, the encoded high-quality video may be stored to a hard-drive of a networked computing device. The type of storage implemented may be varied according to the design criteria of a particular implementation.

The video processor 106 may be configured to send analog video out (e.g., the signal VOUT_LL) to the video transmitter 116. In some embodiments, the signal VOUT_LL generated by the video processor 106 may be a composite and/or HDMI output. The video processor 106 may receive an input for the video signal (e.g., the signal FRAMES) from the CMOS sensor 118a and an input from the sensor 114 (e.g., a gyroscope and/or inertial measurement unit) to determine acceleration data. For example, the acceleration data may be used by the video processor 106 to determine how the drone 50 is moving in order to determine how to compensate in order to stabilize the video. The input video signal FRAMES may be processed by the video processor 106 (e.g., color conversion, noise filtering, auto exposure, auto white balance, auto focus, etc.) and then stabilized by the video processor 106.

The video processor 106 may implement EIS processing without adding a significant amount of delay. In an example, a worst case for EIS implemented by the video processor 106 may be 1 frame in a highest-quality mode. In another example, no delay may be added by the video processor 106 operating in a basic EIS mode. In some embodiments, a high framerate (e.g., 120 fps) may be used to generate the signal VOUT_LL and a lower framerate (e.g., 60 fps, 30 fps) may be used to generate the signal VOUT_EN. In an example, for a higher-quality version of EIS for the signal VOUT_LL there may be a delay of 2 video frames or less (e.g., approximately 16 ms at 120 fps). In another example, for a lower-quality version of EIS for the signal VOUT_LL there may be a delay of 1 video frame or less (e.g., approximately 8 ms at 120 fps). The video processor 106 may be configured to decimate frames to generate the lower framerates for the signal VOUT_EN.

Figure 3:
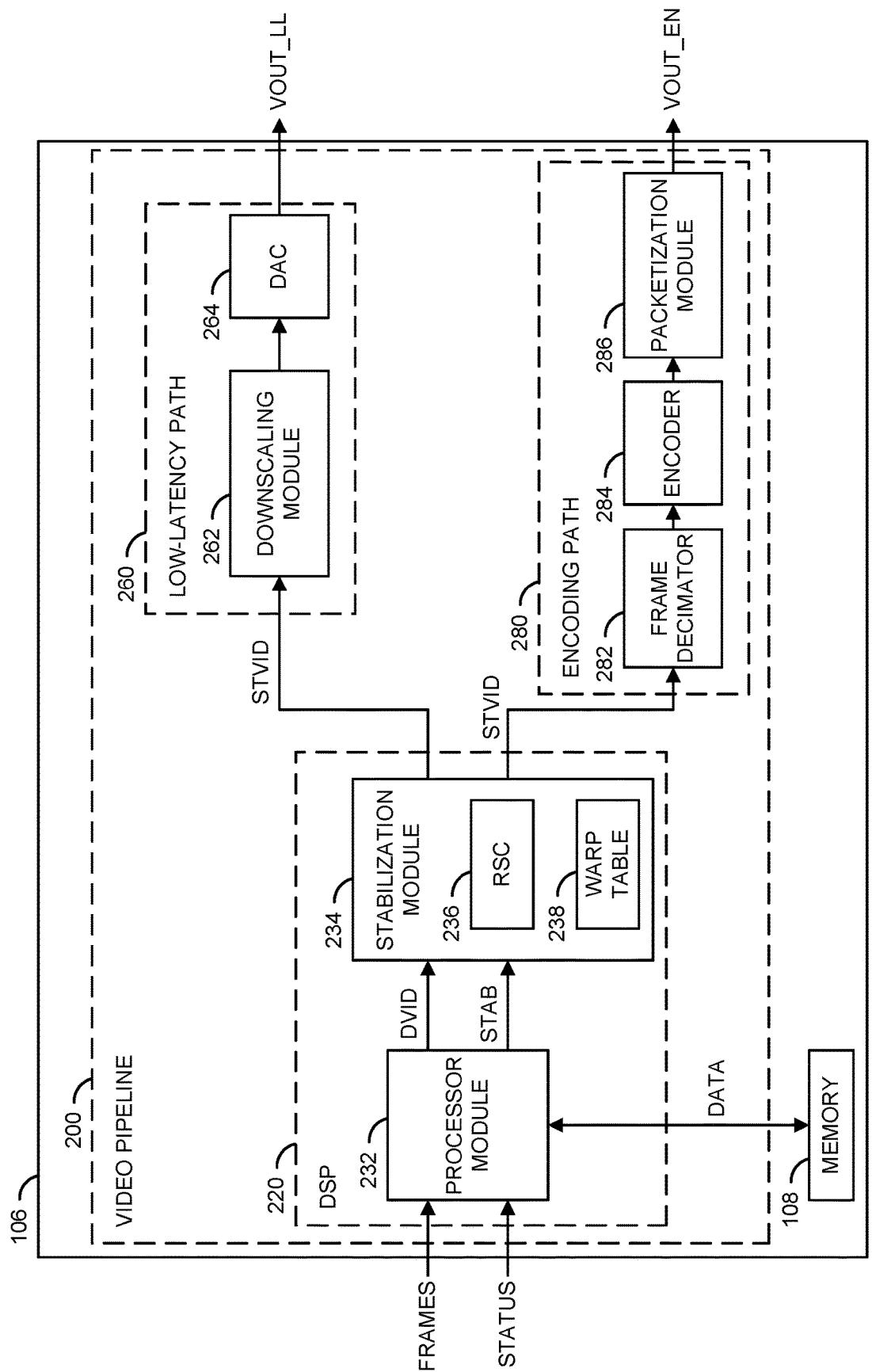
FIG. 3 is a block diagram illustrating an example embodiment of a video pipeline.

Referring to FIG. 3, a block diagram illustrating an example embodiment of a video pipeline 200 is shown. The video processor 106 may implement the video pipeline 200. The video pipeline 200 may implement a sequence of blocks (or circuits, or modules) that are configured to process captured video and/or other data in sequential stages where each stage is configured to perform functions for a different step in parallel. For example, a second stage of the video pipeline 200 may perform a function on input received from a first stage from a previous step, while the first stage of the video pipeline 200 may perform a function on input to generate output for the second stage for a next step.

The video pipeline 200 may comprise a block (or circuit) 220, a block (or circuit) 260 and/or a block (or circuit) 280. The video pipeline 200 may comprise other components (not shown). The circuit 220 may comprise a digital signal processing (DSP) module. The circuit 260 may comprise a low-latency path. The circuit 280 may comprise an encoding path. The components of the video processor 106 and/or the video pipeline 200 may be varied according to the design criteria of a particular implementation.

The DSP module 220 may receive the signal FRAMES and the signal STATUS. The DSP module 220 may send the signal DATA to and/or receive the signal DATA from the memory 108. The DSP module 220 may present a signal (e.g., STVID). The signal STVID may be a stabilized and/or corrected version of the signal FRAMES. The DSP module 220 may present the signal STVID to the low-latency path 260 and the encoding path 280. The DSP module 220 may comprise a block (or circuit) 232 and/or a block (or circuit) 234. The circuit 232 may implement a processor module. The circuit 234 may implement a stabilization module. The DSP module 220 may comprise other components (not shown). The components of the DSP module 220 may be varied according to the design criteria of a particular implementation.

The processor module 232 may receive the signal FRAMES and/or the signal STATUS. The processor module 232 may receive the signal DATA from the memory 108. The processor module 232 may transmit the signal DATA to the memory 108. The processor module 232 may output a signal (e.g., DVID) and a signal (e.g., STAB). The signal DVID may be a processed version of the signal FRAMES. In one example, the signal DVID may be a digital signal. The processor module 232 may perform one or more functions such as color conversion, noise filtering, auto exposure, auto white balance and/or auto focus on the signal FRAMES to generate the signal DVID. The processor module 232 may comprise one or more components and/or sub-modules to perform the functions. The functions and/or sub-modules of the processor module 232 may be varied according to the design criteria of a particular implementation.

The signal STAB may be a processed version of the signal STATUS. In some embodiments, the processor module 232 may receive the signal STATUS. The processing module 232 may be configured to filter the data in the signal STATUS. In an example, the processing module 232 may be configured to ensure that the data from the sensor 114 is synchronized with the video frames from the capture device 102 (e.g., the signal FRAMES). The processor module 232 may be configured to synchronize the video frames of the processed video signal DVID with the motion data of the processed signal STAB.

In some embodiments, the processor module 232 may be configured to receive the signal S_IN. For example, the processor module 232 may comprise the interface 104 (e.g., as one of the sub-modules). In an example, the processor module 232 may comprise a SPI bus and/or a driver (e.g., a software driver) to interpret the data (e.g., the data format of the signal S_IN) coming out of the sensor 114 and use the motion data for stabilization. For example, the signal STATUS may be generated internally by the processor module 232.

The stabilization module 234 may receive the signal DVID and the signal STAB. The stabilization module 234 may generate the signal STVID. In some embodiments, the signal STVID may be generated on two outputs of the stabilization module 234 (e.g., two outputs on two different pins/pads of an integrated circuit). In some embodiments, the signal STVID may be generated on one output of the stabilization module 234. The stabilization module 234 may comprise a block (or circuit) 236 and/or a block (or circuit) 238. The circuit 236 may implement a rolling shutter correction module. The circuit 238 may implement a warp table. The components of the stabilization module 234 may be varied according to the design criteria of a particular implementation.

The DSP module 220 may implement the stabilization module 234. The stabilization module 234 may be implemented as a hardware component (e.g., a custom hardware circuit designed to perform EIS and/or rolling shutter correction). In an example, the stabilization module 234 may be a warp hardware (HW) engine. The warp HW engine 234 may be implemented to perform image stabilization and/or correction of a rolling shutter effect without using software and/or a separate graphics processing unit to perform the EIS. Implementing the stabilization module 234 as a warp HW engine may provide a scalable implementation. For example, apps processors, which need CPU/GPU to implement image stabilization, post much longer delays compared to the hardware stabilization module 234.

Since the FPV racing drone 50 may change direction and/or pan from side-to-side quickly, video captured by the camera sensor 118a may suffer from the rolling shutter effect (e.g., the captured image may appear to wobble during camera movement due to top portions of the camera sensor 118a being exposed before bottom portions of the camera sensor 118a). For example, the lens 112 may move during the time between a start of a frame capture and an end of the frame capture by the camera sensor 118a. The movement of the lens 112 while the camera sensor 118a is performing the frame capture may result in the rolling shutter effect. The drone 50 may move very quickly and the raw video (e.g., the signal FRAMES) may have a lot of rolling shutter artifacts, in addition to being shaky.

In order to remove rolling shutter artifacts, the data from the sensor 114 may be read at a higher frequency than the frequency of the frame capture from the camera sensor 118a. In one example, frame capture may be performed at 30 Hz, while the sensor 114 may be read at 1 kHz. Reading the sensor 114 at a higher frequency may allow the stabilization module 234 and/or the rolling shutter correction module 236 to stabilize the video and/or act within a frame to remove (or at least attenuate) the rolling shutter effect.

The hardware stabilization module 234 may implement a flexible engine. For example, the hardware stabilization module 234 may be reprogrammed inside a frame. The hardware stabilization module 234 may implement the fully programmable warp table 238. The warp table 238 may be reprogrammed for each frame. In some embodiments, the warp table 238 may be reprogrammed inside a frame. The warp table 238 may be calculated in real time to account for the movements of the drone 50. The warp table 238 may be used to perform suitable rotation, translation and/or perspective correction transforms to make the output image appear stable, even though the input image may be shaking in the 6 translation/rotation axes.

The video processor 106 may implement the video pipeline 200. The video pipeline 200 may be forked into at least two paths after the input video has been stabilized and/or corrected in the DSP module 220. In some embodiments, the video pipeline 200 may be forked into at least two paths while the video frames are being processed in the DSP module 220. One path may be the low-latency path 260. Another path may be the encoding path 280. The processed and stabilized video signal (e.g., the signal STVID) from the DSP 220 may be used as an input for the low-latency path 260 and an input for the encoding path 280. For example, one instance of the signal STVID may be operated on by the low-latency path 260 and one instance of the signal STVID may be operated on by the encoding path 280. The low-latency path 260 may output the signal VOUT_LL. The encoding path 280 may output the signal VOUT_EN. For example, the signal VOUT_LL may be a result of the input STVID generated by the low-latency path 260 and the signal VOUT_EN may be a result of the same input STVID generated by the encoding path 280.

In some embodiments, the DSP module 220 may be configured to fork the processing of the video pipeline 200. For example, the low-latency path 260 may comprise a portion of the DSP module 220. In another example, the encoding path 280 may comprise a portion of the DSP module 220. The flexible engine of the hardware stabilization module 234 may be adjusted (e.g., operate in one or more modes). In one example, the stabilization module 234 may operate in a high quality EIS mode. In another example, the stabilization module 234 may operate in a fast EIS mode (e.g., a lower quality mode). The EIS mode for the stabilization module 234 may be selected as an option made available as a user setting (e.g., the EIS mode for the stabilization module 234 may be selected by the pilot 60).

In an example, when the electronic image stabilization is operating in a high quality EIS mode (e.g., generating a video having a high visual quality), the processor module 232 may capture the whole video frame (e.g., from the signal FRAMES) and the associated status information (e.g., gyroscope information in the signal STATUS). The processor module 232 may dump the whole video frame to the memory 108 (e.g., as the signal DATA). The warp table 238 may be calculated by the stabilization module 234 for the whole frame based on the information in the signal STATUS. In an example, vibrations (e.g., high frequency and/or low frequency) may be corrected. The rolling shutter correction module 236 may implement the rolling shutter correction. User input to the drone 50 (e.g., intentionally turning and/or other flight controls) may be filtered (e.g., intentional movement may not need to be corrected). The warp table 238 may be applied to the whole video frame to generate the stabilized video. The stabilized video signal STVID may be presented to the low-latency path 260 and/or the encoding path 280. In an example, the high quality EIS mode may be performed in less than 2 frame times.

In another example, when the electronic image stabilization is operating in a fast EIS mode for low-latency output (e.g., quickly generating a video that may have a lower visual quality), the processor module 232 may capture a portion of the video frame (e.g., from the signal FRAMES) and the associated status information (e.g., gyroscope information in the signal STATUS). In an example, the portion of the video frame may be a tile. The size of the tile may be varied according to the design criteria of a particular implementation.

In some embodiments, the portion of the video frame may be processed by the components of the DSP module 220 without storing information to and/or retrieving information from the memory 108. In some embodiments, the components of the DSP module 220 may access the memory 108 to process the portion of the video frame. Generally, the portion of the video frame may be processed using fewer accesses to the memory 108 in the fast EIS mode than a number of accesses to the memory 108 in the high quality EIS mode. The warp table 238 may be calculated by the stabilization module 234 for the portion of the video frame based on the information in the signal STATUS. In an example, vibrations (e.g., high frequency and/or low frequency) may be corrected. The rolling shutter correction module 236 may implement the rolling shutter correction. User input to the drone 50 (e.g., intentionally turning and/or other flight controls) may be filtered (e.g., intentional movement may not need to be corrected). The warp table 238 may be applied to the portion of the video frame to generate the stabilized video portion (e.g., a stabilized tile). The DSP module 220 may generate stabilized video portions until the whole frame has been stabilized. The stabilized video signal STVID may be presented to the low-latency path 260 and/or the encoding path 280. In an example, the fast EIS mode may be performed in less than 1 frame time. Generally, the visual quality of the high quality EIS mode is higher than the visual quality of the fast EIS mode. Generally, the fast EIS mode is performed in less time than the high quality EIS mode.

The low-latency path 260 may receive the signal STVID. The low-latency path 260 may present the signal VOUT_LL. The low-latency path 260 may comprise a block (or circuit) 262 and/or a block (or circuit) 264. The circuit 262 may be a downscaling module. The downscaling module 262 may be an optional component of the low-latency path 260. The circuit 264 may be a digital to analog convertor (DAC). The low-latency path 260 may comprise other components (not shown). In some embodiments, the low-latency path 260 may implement one or more components configured to perform video cropping, HDR processing and/or video analytics. In an example, HDR processing may be implemented to prevent blinding effects caused by a transition from a dark area to a bright area (e.g., being blinded when exiting a tunnel). In yet another example, video analytics may be implemented to detect and/or track objects in video frames (e.g., to keep a field of view of the pilot focused on a particular object by performing electronic pan/tilt/zoom). The components of the low-latency path 260 may be varied according to the design criteria of a particular implementation.

In the low-latency path 260, the stabilized and corrected video signal STVID may be downscaled and/or converted (e.g., a digital-to-analog conversion). The low-latency path 260 may present the output signal VOUT_LL. The signal VOUT_LL may be presented to the transmitter 116. The components of the low-latency path 260 may introduce a very low amount of delay. For example, the delay of the low-latency path 260 may be negligible (e.g., virtually unnoticeable by the pilot 60). Generating the output VOUT_LL using the low-latency path 260 may enable an almost instant stabilized analog video. An almost instant stabilized video may improve a viewing experience for the pilot 60 (e.g., less shakiness when viewed using the display device 62, which may reduce nausea experienced by the pilot 60) and still provide the pilot 60 with video that represents the actual position of the drone 50.

The apparatus 100 may decrease an amount of time (e.g., avoid delays) for generating the live video feed signal VOUT_LL (e.g., the analog stream) by not performing encoding on the signal STVID in the low-latency path 260. In some embodiments, the live video feed signal VOUT_LL may be an analog video. In one example, the analog video may implement PAL formatting. In another example, the analog video may implement NTSC formatting. In some embodiments, the live video feed signal VOUT_LL may be a digital video. For example, some video transmitters may implement high-definition (HD) with HDMI input. Implementing an HDMI input to the video transmitter 116 may enable an increased video resolution compared to PAL/NTSC.

In some embodiments, the low-latency path 260 may optionally comprise the downscaling module 262. The downscaling module 262 may reduce a resolution of the video signal STVID. Reducing the resolution of the video signal STVID may enable compliance of the signal VOUT_LL with the protocol of the transmission module 116. Implementing the downscaling module for the analog video for the live video feed signal VOUT_LL may result in an output video that is downscaled compared to the video captured by the capture device 102. For example, the captured video signal FRAMES may have a high resolution (e.g., 4K video, 1080p video, 720p video, etc.) and the analog video stream VOUT_LL may be downscaled to PAL/NTSC (e.g., a 480i/576i signal).

The low-latency path 260 may comprise the DAC 264. The DAC 264 may be implemented to enable generation of an analog video stream directly. The DAC 264 may convert a digital signal (e.g., the signal STVID) to an analog signal. For example, the analog signal may be transmitted by the RC transmitter 116. In one example, the DAC 264 may generate a composite 480i/576i signal.

In some embodiments, the low-latency path 260 may output the signal VOUT_LL through HDMI. For example, the signal VOUT_LL may be implemented as a digital signal. When the low-latency path 260 outputs the signal VOUT_LL through HDMI, encoding may be skipped. Skipping the encoding may result in delay savings. The DAC 264 may be an optional component. For example, implementing the DAC 264 may not be needed when the signal VOUT_LL is output through HDMI.

The encoding path 280 may receive the stabilized and corrected video signal STVID. The encoding path 280 may present the signal VOUT_EN. The encoding path 280 may comprise a block (or circuit) 282, a block (or circuit) 284 and/or a block (or circuit) 286. The circuit 282 may implement a frame decimator. The circuit 284 may implement an encoder. The circuit 286 may implement a packetization module. The encoding path 280 may comprise other components (not shown). The components of the encoding path 280 may be varied according to the design criteria of a particular implementation.

On the encoding path 280, the frame decimator 282 may decimate the video frames of the video signal STVID for encoding. The encoder 284 may encode the decimated video frames of the video signal STVID (e.g., approximately 2 frames). The packetization module 286 may packetize the data for transmission (e.g., to comply with a protocol such as Ethernet) to output the signal VOUT_EN. Additional delay may be introduced during playback. For example, the playback device 62 may de-packetize and decode the signal VOUT_EN on the other end of transmission. The encoding path 280 may further comprise one or more buffers to prevent delay jitter when generating the signal VOUT_EN. The signal STVID may be encoded and/or packetized for transmission on the encoding path 280.

The frame decimator 282 may be configured to decimate video frames. The capture device 102 may be configured to generate video frames (e.g., the signal FRAMES) from the sensor 118a at a high framerate (e.g., 120 fps). The frame decimator 282 may be configured to decimate the video framerate for encoding (e.g., 60 fps, 30 fps, 15 fps, etc.). In an example, a high framerate (e.g., 120 fps) may be too high for the encoded video signal VOUT_EN. Decimating the framerate may enable encoding at 60 fps and/or 30 fps. The frame decimator 282 may be implemented on the encoding path 280. For example, on the low-latency path 260, the delay may be in a number of frames (e.g., 1 or 2 frames) to generate the stabilized output video VOUT_LL. At a 120 fps capture rate, the delay on the low-latency path 260 may be approximately 16 ms from light being captured by the sensor 118a to the low-latency path 260 outputting the stabilized output video VOUT_LL (e.g., four times faster than at the decimated frame rate of 30 fps). Implementing the frame decimator 282 on the encoding path 280 may enable encoding to be performed for the signal VOUT_EN and/or avoid delay on the low-latency path 260.

The encoder 284 may receive the signal STVID having a decimated framerate from the frame decimator 282. The encoder 284 may be configured to perform encoding, transcoding, conversion and/or compression. In one example, the encoder 284 may implement H.264 encoding. In another example, the encoder 284 may implement HEVC encoding. Other types of encoding may be implemented (e.g., DivX, Daala, VP9, etc.). The encoding implemented by the encoder 284 may operate on the full resolution captured by the capture device 102. The type of encoding performed by the encoder 284 may be varied according to the design criteria of a particular implementation.

The packetization module 286 may packetize the data for the signal VOUT_EN for transmission. The encoding path 280 may output the signal VOUT_EN. The signal VOUT_EN may be stored locally (e.g., the memory 108) and/or sent via wireless communication (e.g., Wi-Fi) for remote viewing. In some embodiments, the packetization module 286 may be configured to perform packetization for one or more protocols.

The encoding path 280 may generate the signal VOUT_EN for later viewing and/or sharing. The signal VOUT_LL may be a time-sensitive signal (e.g., introducing delay may results in poor performance and/or user experience). For example, for the signal VOUT_LL, the amount of delay introduced may be of greater importance than image quality. Generally, the signal VOUT_EN is not a time-sensitive signal (e.g., an amount of delay may be irrelevant to performance and/or user experience). For example, for the signal VOUT_EN, the image quality, bandwidth requirements and/or file size may be of greater importance than the amount of delay introduced. In embodiments of the apparatus 100 where the generation of the signal VOUT_LL and the generation of the signal VOUT_EN share resources, the generation of the signal VOUT_LL may have a higher priority.

Figure 4:
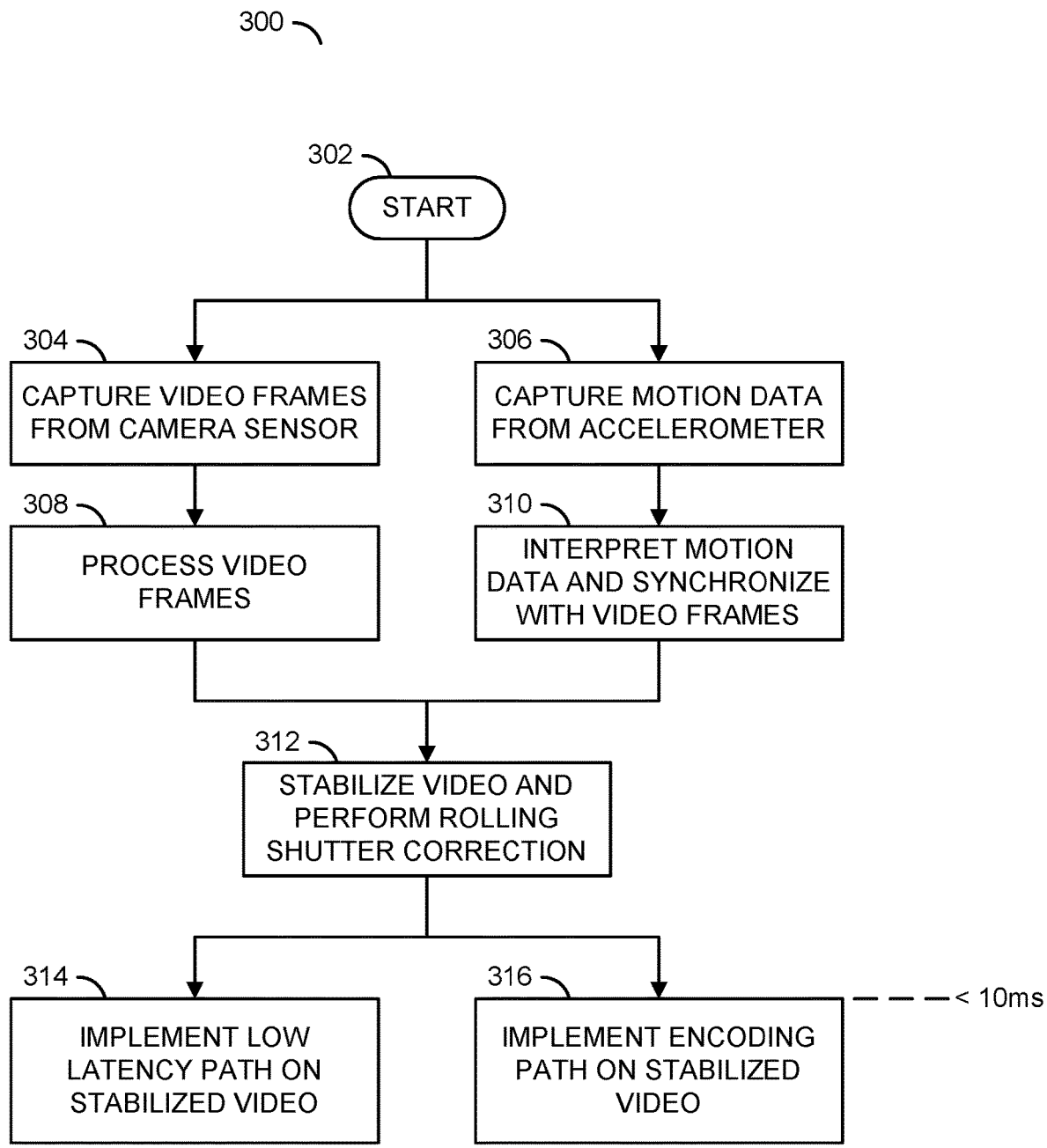
FIG. 4 is a timing diagram illustrating electronic image stabilization for a live video feed.

Referring to FIG. 4, a flow diagram illustrating a first portion of a timing diagram 300 for electronic image stabilization for a live video feed is shown. The first portion of the timing diagram 300 generally comprises a step (or state) 302, a step (or state) 304, a step (or state) 306, a step (or state) 308, a step (or state) 310, a step (or state) 312, a step (or state) 314, and a step (or state) 316.

The state 302 may start the timing diagram 300. Next, in the state 304, the camera sensor 118a may capture video frames (e.g., generate the signal FRAMES). In the state 306, the sensor 114 (e.g., an accelerometer) may capture motion data (e.g., generate the signal STATUS). In some embodiments, the state 304 and/or the state 306 may be performed in parallel and/or generally at the same time. Next, in the state 308, the processor module 232 may process the video frames. In the state 310, the processor module 232 may interpret the motion data and synchronize the motion data with the video frames. In some embodiments, the state 308 and/or the state 310 may be performed in parallel and/or generally at the same time. In an example, the processor module 232 may receive the signal FRAMES and the signal STATUS and generate the signal DVID and the signal STAB (e.g., synchronize the video frames of the processed video signal DVID with the motion data of the processed signal STAB).

Next, in the state 312, the stabilization module 234 may stabilize the video and/or perform rolling shutter correction. In an example, the stabilization module 234 may present the signal STVID to the low-latency path 260 and/or the encoding path 280. The state 312 may generate the stabilized and/or rolling shutter corrected video signal STVID. The stabilized and/or rolling shutter corrected video signal STVID may be generated within approximately 10 ms. For example, the video frames may be captured by the capture device 102 and electronic image stabilization may be performed by the DSP module 220 in less than 10 ms. In an example, when the fast mode for electronic image stabilization is implemented, the signal STVID may be generated within 1 frame time (e.g., approximately 8 ms when the sensor 118a captures at 120 fps). In an example, when the high-quality mode for electronic image stabilization is implemented, the signal STVID may be generated within 2 frames.

Next, in the state 314, the low-latency path 260 portion of the video pipeline 200 may be implemented for the stabilized video signal STVID. In the state 316, the encoding path 280 portion of the video pipeline 200 may be implemented for the stabilized video signal STVID. The low-latency path 260 and the encoding path 280 may be processed in parallel. For example, the low-latency path 260 and the encoding path 280 may be initiated at approximately the same time. However, the amount of time for the low-latency path 260 to generate the signal VOUT_LL and the amount of time for the encoding path 280 to generate the signal VOUT_EN may be different.

Figure 5:
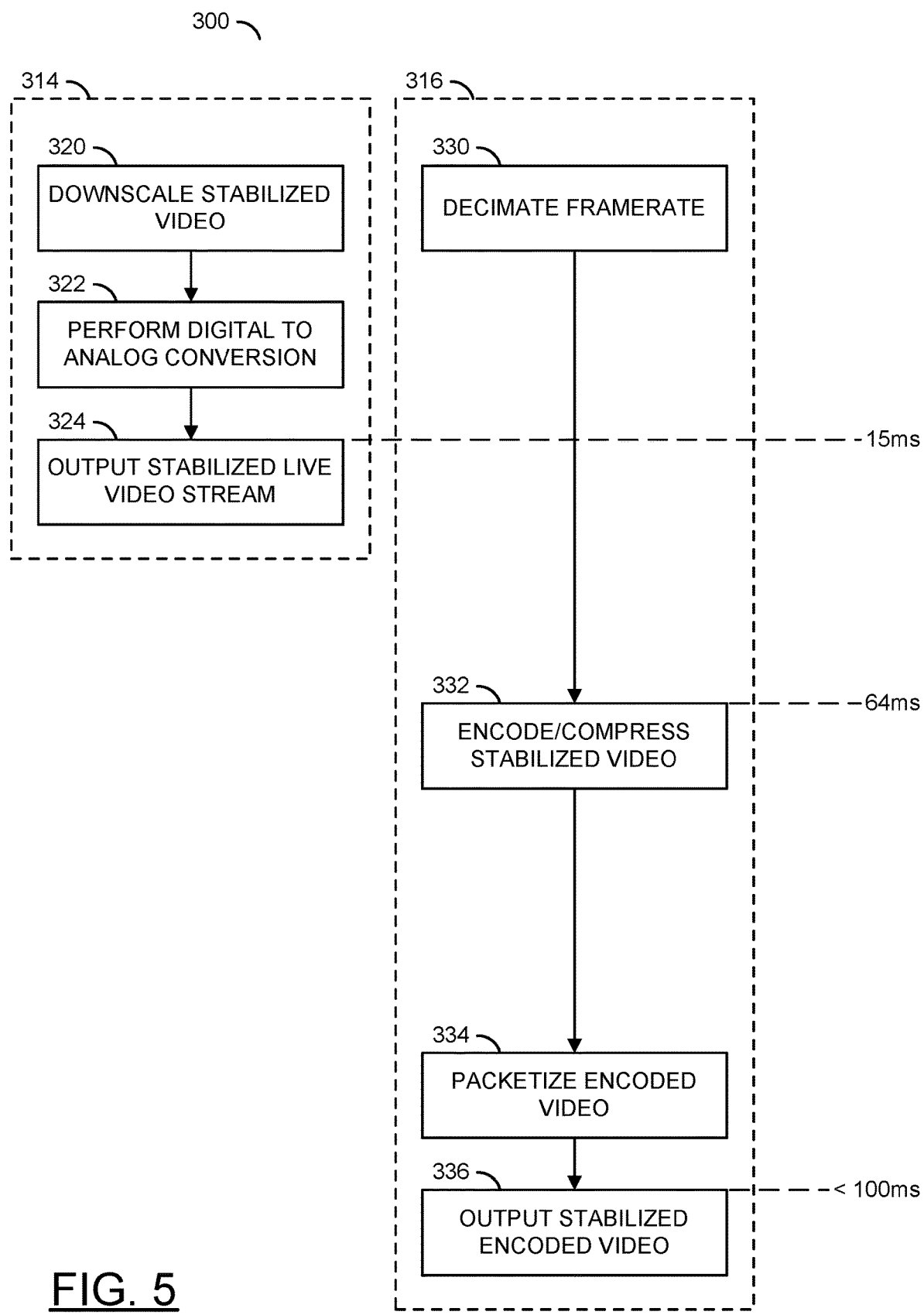
FIG. 5 is a timing diagram illustrating generating a video stream using a low-latency path and generating a video stream using an encoding path in a video pipeline.

Referring to FIG. 5, a flow diagram illustrating a second portion of the timing diagram 300 for generating a video stream using the low-latency path 260 and generating a video stream using the encoding path 280 in the video pipeline 220 is shown. The second portion of the timing diagram 300 may describe details of the low-latency path implementation 314 and/or details of the encoding path implementation 316. The low-latency path implementation 314 generally comprises a step (or state) 320, a step (or state) 322, and a step (or state) 324. The encoding path implementation 316 generally comprises a step (or state) 330, a step (or state) 332, a step (or state) 334, and a step (or state) 336.

In the state 320 of the low-latency path implementation 314, the downscaling module 262 may downscale the stabilized video STVID. Next, in the state 322 of the low-latency path implementation 314, the DAC 264 may perform a digital to analog conversion. Next, in the state 324 of the low-latency path implementation 314, the stabilized output video stream VOUT_LL may be generated. The state 324 may end the low-latency path implementation 314.

The stabilized and/or rolling shutter corrected video signal VOUT_LL may be output within approximately 15 ms. For example, the video frames may be captured by the capture device 102, electronic image stabilization may be performed by the DSP module 220 and the signal VOUT_LL may be generated (e.g., downscaled, converted and output) in less than 15 ms. In an example, the low-latency path implementation 314 may be performed in approximately 5 ms. In some embodiments, additional video operations may be performed on the low-latency path 260 (e.g., cropping, image analysis, object detection, electronic pan/zoom/tilt, etc.). In an example, the additional video operations may be performed before the operations by the DAC 264. The additional video operations may add a small amount of time to the low-latency path implementation 314 (e.g., a few milliseconds). In the state 330 of the encoding path implementation 316, the frame decimator 282 may decimate the framerate of the stabilized video STVID. In one example, the framerate may be decimated to 60 fps. In another example, the framerate may be decimated to 30 fps. An amount of time for decimating the framerate may be based on the output framerate. For example, with a capture rate of 120 fps by the sensor 118a, decimating to 30 fps may take twice as long as decimating to 60 fps. In the example shown for the timing diagram 300, the framerate may be decimated to 30 fps. Decimating the framerate to 30 fps may be performed within 64 ms. For example, the video frames may be captured by the capture device 102, electronic image stabilization may be performed by the DSP module 220 and the signal STVID may be decimated to 30 fps in less than 64 ms. The signal VOUT_LL may be output by the low-latency path 260 before the framerate is decimated on the encoding path 280.

Next, in the state 332 of the encoding path implementation 316, the encoder 284 may encode and/or compress the decimated stabilized video signal. Next, in the state 334 of the encoding path implementation 316, the packetization module 286 may packetize the encoded video stream for output. Next, in the state 336 of the encoding path implementation 316, the encoding path 280 may output the stabilized, encoded video signal VOUT_EN.

The encoded, stabilized and/or rolling shutter corrected video signal VOUT_EN may be output within approximately 100 ms. For example, the video frames may be captured by the capture device 102, electronic image stabilization may be performed by the DSP module 220, the framerate may be decimated and the signal VOUT_EN may be encoded, compressed and/or packetized in less than 100 ms. In an example, the encoding path implementation 316 may be performed within approximately 90 ms. In some embodiments, additional video operations may be performed on the encoding path 280 (e.g., cropping, image analysis, object detection, electronic pan/zoom/tilt, etc.). In an example, the additional video operations may be performed before the operations by the encoder 284. The additional video operations may add a small amount of time to the encoding path implementation 316 (e.g., a few milliseconds).

Figure 6:
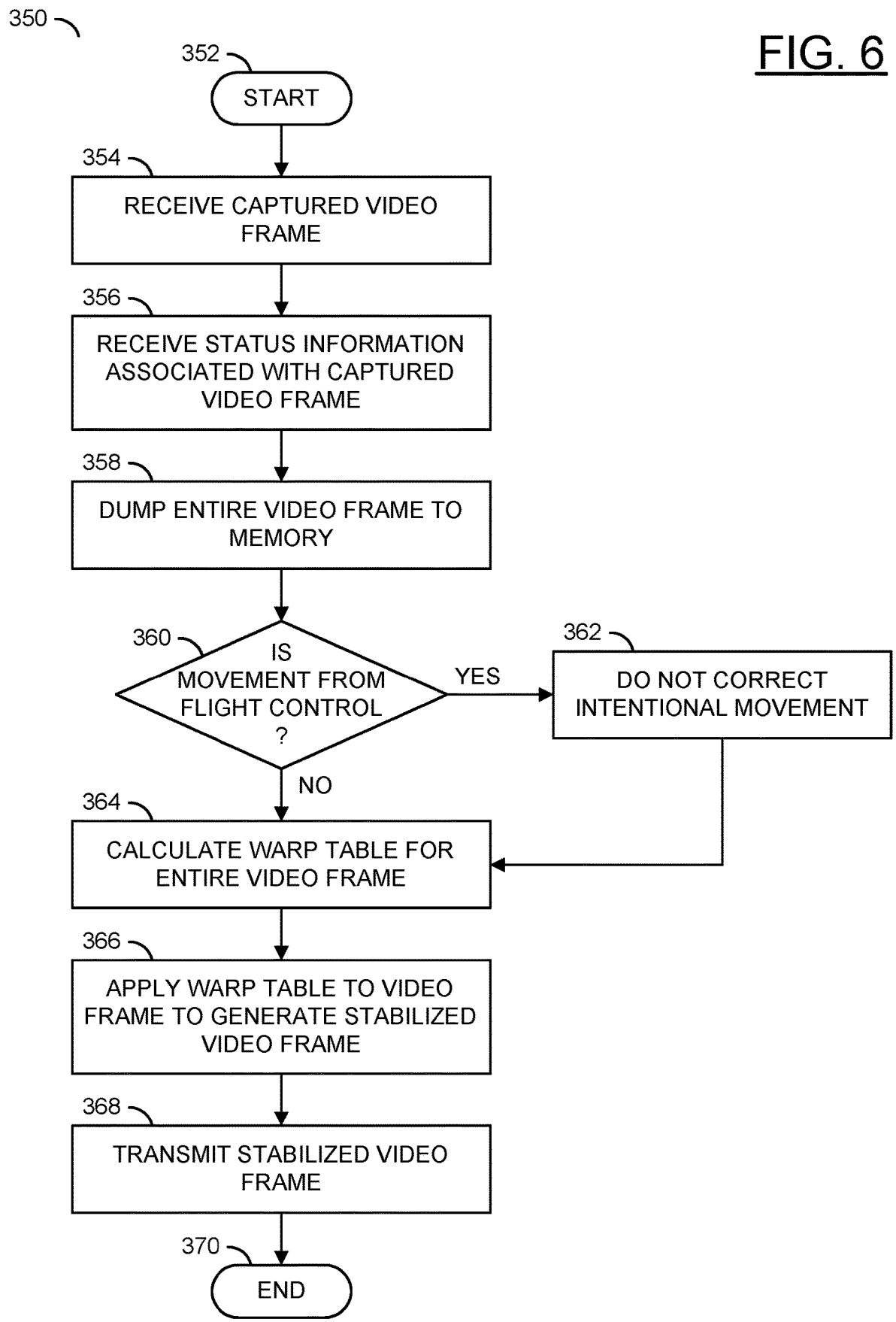
FIG. 6 is a flow diagram illustrating a method for implementing a high quality electronic image stabilization mode.

Referring to FIG. 6, a method (or process) 350 is shown. The method 350 may implement a high quality electronic image stabilization mode. The method 350 generally comprises a step (or state) 352, a step (or state) 354, a step (or state) 356, a step (or state) 358, a decision step (or state) 360, a step (or state) 362, a step (or state) 364, a step (or state) 366, a step (or state) 368, and a step (or state) 370.

The state 352 may start the method 350. In the state. 354, the video pipeline 200 may receive the captured video frame (e.g., the signal FRAMES may be presented to the processor module 232 in the DSP module 220). In the state 356, the video pipeline 200 may receive the status information associated with the captured video frame (e.g., the signal STATUS may be presented to the processor module 232 in the DSP module 220). In some embodiments, the state 354 and the state 356 may be performed in parallel. Next, in the state 358, the DSP module 220 may dump the entire video frame to the memory 108. Next, the method 350 may move to the decision state 360.

In the decision state 360, the processor module 232 may determine whether there is movement from flight control (e.g., intentional movement). If the movement is from flight control, the method 350 may move to the state 362. In the state 362, the stabilization module 234 may not correct intentional movement. Next, the method 350 may move to the state 364. In the decision state 360, if the movement is not from flight control, the method 350 may move to the state 364.

In the state 364, the stabilization module may calculate the warp table 238 for the entire video frame. Next, in the state 366, the stabilization module may apply the warp table 238 to the video frame to generate the stabilized video frame STVID. In some embodiments, the rolling shutter correction module 236 may correct a rolling shutter effect for the video frame. Next, in the state 368, the DSP module 220 may transmit the stabilized video frame STVID. For example, the signal STVID may be transmitted to the low-latency path 260 and/or the encoding path 280. Next, the method 350 may move to the state 370. The state 370 may end the method 350.

Figure 7:
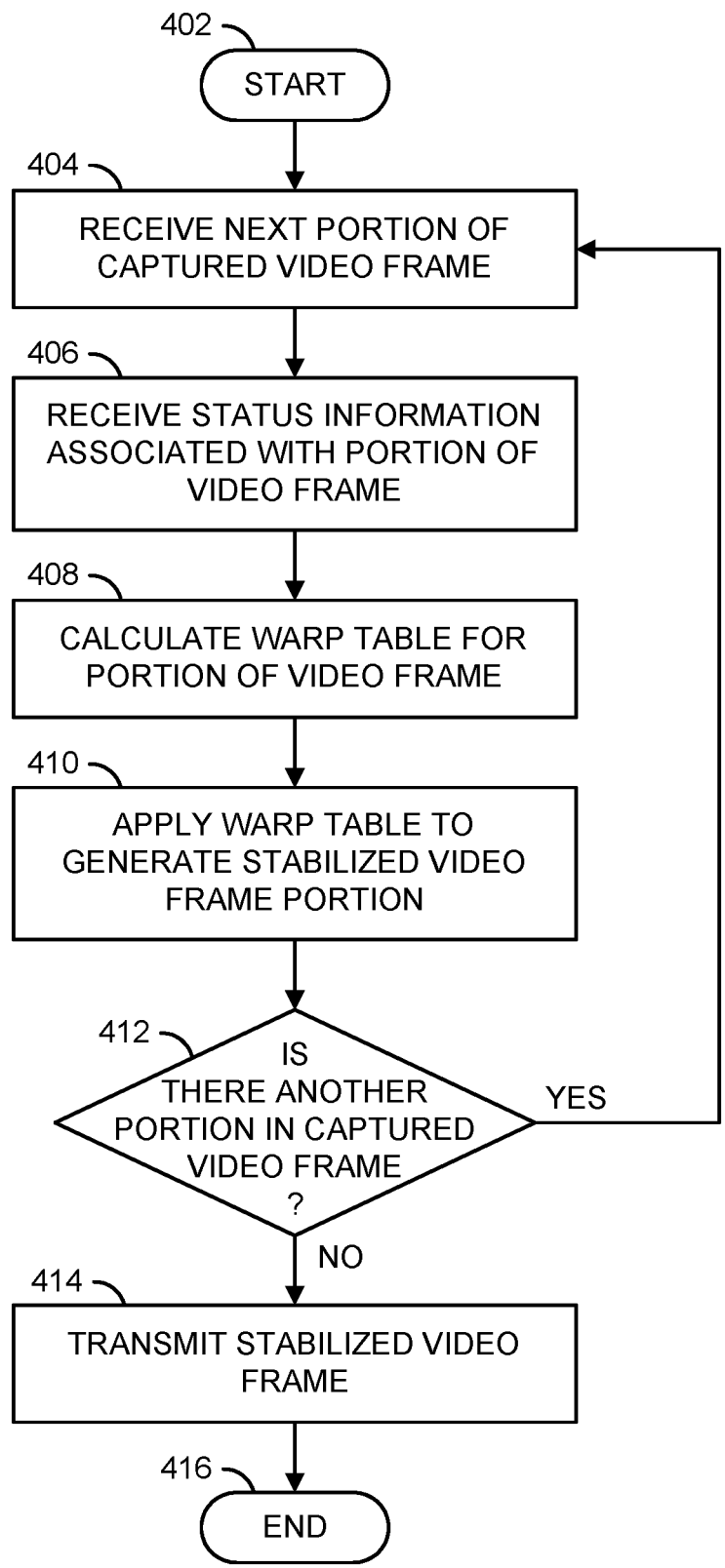
FIG. 7 is a flow diagram illustrating a method for implementing a fast electronic image stabilization mode.

Referring to FIG. 7, a method (or process) 400 is shown. The method 400 may implement a fast electronic image stabilization mode. The method 400 generally comprises a step (or state) 402, a step (or state) 404, a step (or state) 406, a step (or state) 408, a step (or state) 410, a decision step (or state) 412, a step (or state) 414, and a step (or state) 416.

The state 402 may start the method 400. In the state 404, the processing module 232 may receive a next portion of the capture video frame (e.g., in the signal FRAMES). Next, in the state 406, the processing module 232 may receive the status information associated with the portion of the video frame. In the state 408, the stabilization module 234 may calculate the warp table 238 for the portion of the video frame.

Next, in the state 410, the stabilization module 234 may apply the warp table 238 to generate the stabilized video frame portion. Next, the method 400 may move to the decision state 412. In the decision state 412, the processor module 232 may determine whether there is another portion in the captured video frame (e.g., whether the portions already generated cover the entire video frame). If there is another portion in the captured video frame, the method 400 may return to the state 404. If there is not another portion in the captured video frame, the method 400 may move to the state 414. In the state 414, the DSP module 220 may transmit the stabilized video frame STVID. For example, the signal STVID may be transmitted to the low-latency path 260 and/or the encoding path 280. Next, the method 400 may move to the state 416. The state 416 may end the method 400.

Figure 8:
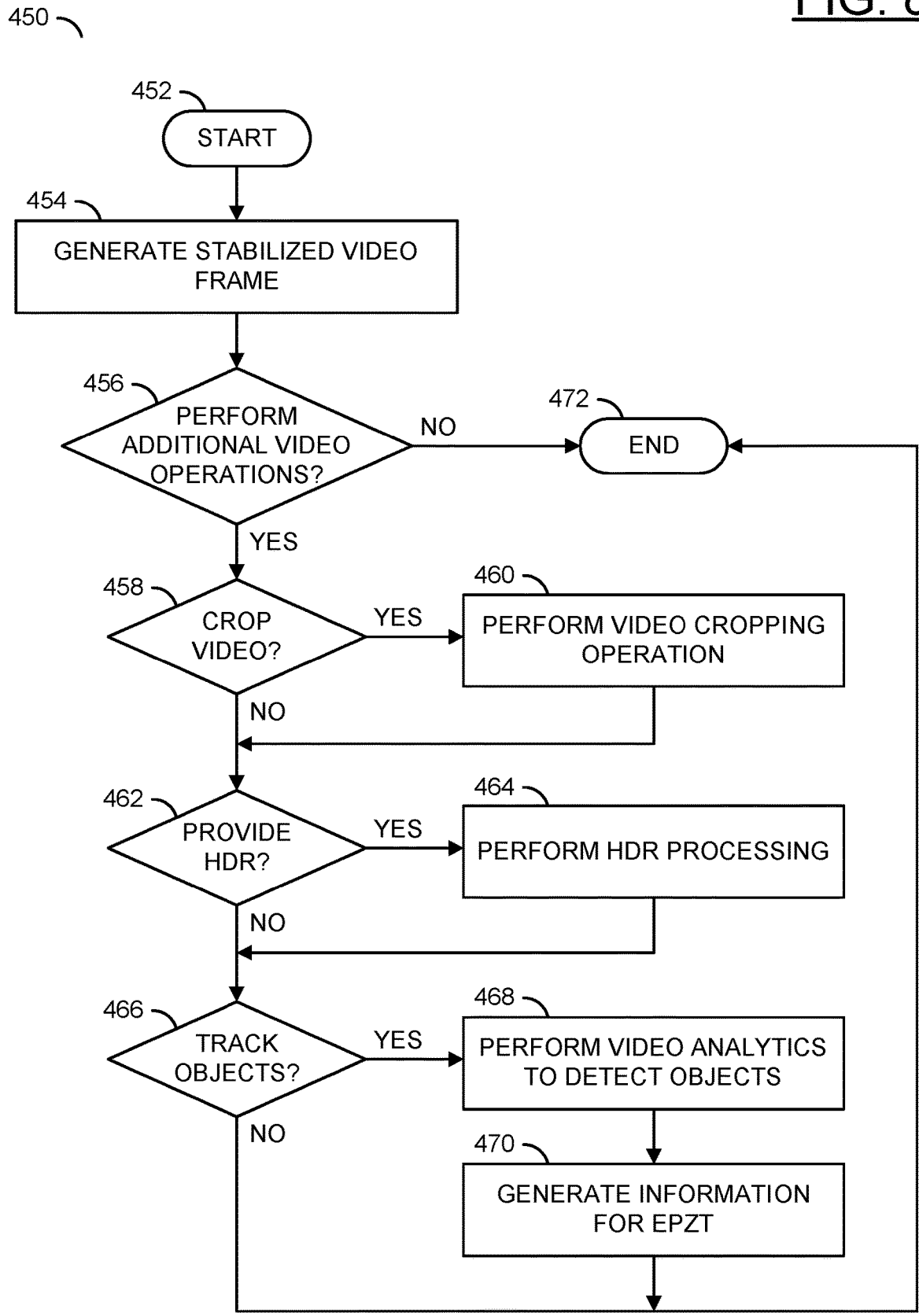
FIG. 8 is a flow diagram illustrating a method for performing additional video operations on a low-latency path.

Referring to FIG. 8, a method (or process) 450 is shown. The method 450 may perform additional video operations on the low-latency path 260 and/or the encoding path 280. The method 450 generally comprises a step (or state) 452, a step (or state) 454, a step (or state) 456, a decision step (or state) 458, a step (or state) 460, a decision step (or state) 462, a step (or state) 464, a decision step (or state) 466, a step (or state) 468, a step (or state) 470, and a step (or state) 472.

The state 452 may start the method 450. In the state 454 the DSP module 220 may generate the stabilized video frame STVID and present the signal STVID to the low-latency path 260 and/or the encoding path 280. Next, the method 450 may move to the decision state 456. The low-latency path 260 and/or the encoding path 280 may each be configured to perform additional video operations. Various modules may be implemented in the low-latency path 260 and/or the encoding path 280 to perform the various additional video operations. In an example, a cropping module, a HDR processor and/or an object tracking module may be implemented. The type of additional video operations and/or the modules implemented to perform the additional video operations may be varied according to the design criteria of a particular implementation.

In the decision state 456, the video pipeline 200 may determine whether or not to perform additional video operations. If not, the method 450 may move to the state 472. If additional video operations may be performed, the method 450 may move to the decision state 458. In the decision state 458, the video pipeline 200 may determine whether to crop the video. If the video pipeline crops the video the method 450 may move to the state 460. If not, the method 450 may move to the decision state 462. In the state 460, one or more modules of the video pipeline 200 may perform a video cropping operation (e.g., in the low-latency path 260 and/or the encoding path 280). Next, the method 450 may move to the decision state 462.

In the decision state 462, the video pipeline 200 may determine whether or not to provide HDR processing. If the video pipeline 200 performs HDR processing, the method 450 may move to the state 464. If not, the method 450 may move to the decision state 466. In the state 464, one or more modules of the video pipeline 200 may perform HDR processing (e.g., in the low-latency path 260 and/or the encoding path 280). Next, the method 450 may move to the decision state 466.

In the decision state 466, the video pipeline 200 may determine whether or not to track objects (e.g., perform an analysis of the visual content in the video frames to recognize objects and/or track objects from video frame to video frame). If the video pipeline 200 tracks objects, the method 450 may move to the state 468. If not, the method 450 may move to the state 472. In the state 468, one or more modules of the video pipeline 200 may perform video analytics to detect objects (e.g., in the low-latency path 260 and/or the encoding path 280). Next, in the state 470, one or more modules of the video pipeline 200 may generate information to perform electronic pan/zoom/tilt (EPZT). Next, the method 450 may move to the state 472. The state 472 may end the method 450.

The functions and structures illustrated in the diagrams of FIGS. 1 to 8 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
  an image sensor configured to generate a video signal based on a targeted view of an environment; and
  a processor configured to
  (A) calculate a warp table based on information from a sensor, wherein said sensor may be a gyroscope, accelerometer and/or an inertial measurement unit, said warp table to be calculated in real-time to account for movements of the apparatus,
  (B) perform an image stabilization on said video signal using said warp table to perform suitable rotation, translation and/or perspective correction transforms to make an output image appear stable,
  (C) present an intermediate signal generated in response to said image stabilization to a first path and a second path and
  (D) generate (i) a first output video signal on said first path using a downscaling module and (ii) a second output video signal on said second path using an encoder, wherein
  (a) said image stabilization is performed prior to said generation of said first output video signal and said second output video signal,
  (b) said first output video signal is a downscaled version of said intermediate signal,
  (c) said second output video signal is an encoded video signal,
  (d) said processor generates said first output video signal having said image stabilization prior to said processor storing and encoding said second output video signal, and
  (e) said processor presents said first output video signal as a live video feed usable by a display device.

2. The apparatus according to claim 1, wherein a sensor in said display device is configured to capture movement information, wherein said movement information is used by said processor to filter out intentional movement of said display device when performing said image stabilization.

3. The apparatus according to claim 2, wherein said intentional movement is received from a controller implementing said display device.

4. The apparatus according to claim 1, wherein said processor does not apply said image stabilization to intentional movement received from a controller implementing said display device.

5. The apparatus according to claim 1, wherein said first output video signal generated by the processor is transmitted to said display device using a transmitter.

6. The apparatus according to claim 5, wherein said first output video signal is transmitted using at least one of (a) a radio-frequency (RF) transmitter, and (b) a composite output.

7. The apparatus according to claim 1, wherein said first output video signal generated by the processor comprises a composite video signal.

8. The apparatus according to claim 1, wherein said first output video signal generated by the processor is generated on said first path without encoding to avoid a delay associated with encoding said video signal.

9. The apparatus according to claim 1, wherein said second output video signal generated by the processor comprises an encoded high-definition version of said video signal.

10. The apparatus according to claim 9, wherein said second output video signal is (a) stored to a local storage device in a first mode and (b) transmitted using a Wi-Fi transmitter in a second mode.

11. The apparatus according to claim 1, wherein a resolution of said second output video signal generated by the processor is higher than a resolution of said first output video signal.

12. The apparatus according to claim 1, wherein said apparatus is implemented as a component of an unmanned aerial vehicle.

13. The apparatus according to claim 12, wherein said first output video signal generated by the processor is transmitted using a transmitter to a pilot of said unmanned aerial vehicle to provide a first-person view.

14. The apparatus according to claim 12, wherein (i) said first output video signal generated by the processor is transmitted using a transmitter operating on a first communication frequency and (ii) control signals for said unmanned aerial vehicle are transmitted using said transmitter on a second communication frequency.

15. The apparatus according to claim 1, wherein said second output video signal generated by the processor is an encoded digital signal.

16. The apparatus according to claim 1, wherein (i) said processor comprises a digital signal processing hardware module and (ii) said image stabilization is performed by said digital signal processing hardware module.

17. The apparatus according to claim 1, wherein said second path comprises said encoder configured to encode said second output video signal and a module configured to packetize said second output video signal for transmission.

18. The apparatus according to claim 1, wherein said first path comprises a digital to analog converter module.

* * * * *